United States Patent
Jeon et al.

(10) Patent No.: US 8,031,666 B2
(45) Date of Patent: Oct. 4, 2011

(54) METHOD FOR TRANSMITTING A DATA PACKET AND A METHOD OF ALLOCATING A CHANNEL IN A WIRELESS NETWORK

(75) Inventors: Beom Jin Jeon, Seoul (KR); Taek Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/374,572

(22) PCT Filed: Jan. 29, 2008

(86) PCT No.: PCT/KR2008/000541
§ 371 (c)(1),
(2), (4) Date: Jan. 21, 2009

(87) PCT Pub. No.: WO2008/093991
PCT Pub. Date: Aug. 7, 2008

(65) Prior Publication Data
US 2009/0310574 A1    Dec. 17, 2009

Related U.S. Application Data

(60) Provisional application No. 60/888,052, filed on Feb. 2, 2007.

(30) Foreign Application Priority Data

Jun. 26, 2007 (KR) .......... 10-2007-0062892
Sep. 4, 2007 (KR) .......... 10-2007-0089425

(51) Int. Cl.
*H04W 4/00* (2009.01)
(52) U.S. Cl. ........ 370/329; 370/231; 370/235; 370/252; 370/468
(58) Field of Classification Search .......... 370/329, 370/230, 231, 235, 252, 468
See application file for complete search history.

(56) References Cited

U.S. PATENT DOCUMENTS

| 6,295,448 | B1 | 9/2001 | Hayes, Jr. et al. | |
|---|---|---|---|---|
| 6,366,566 | B1 | 4/2002 | Scott | |
| 2004/0032847 | A1 | 2/2004 | Cain | |
| 2005/0234735 | A1 | 10/2005 | Williams | |
| 2006/0050742 | A1 | 3/2006 | Grandhi et al. | |
| 2007/0253391 | A1* | 11/2007 | Shao et al. .......... | 370/338 |
| 2008/0031136 | A1* | 2/2008 | Gavette et al. ........ | 370/235 |
| 2008/0101253 | A1* | 5/2008 | Shvodian ........... | 370/252 |
| 2008/0137684 | A1* | 6/2008 | Huang et al. .......... | 370/447 |

(Continued)

FOREIGN PATENT DOCUMENTS
EP    1605665    12/2005
(Continued)

*Primary Examiner* — Luat Phung
(74) *Attorney, Agent, or Firm* — Lee, Hong, Degerman, Kang & Waimey

(57) ABSTRACT

A present invention is related to a method for transmitting a data packet in a wireless network. An exemplary method comprises requesting to allocate a bi-directional channel time block including a first channel time block for transmitting a specific data packet and a second channel time block for receiving a response to the specific data packet; transmitting the specific data packet through the first channel time block; and receiving the response to the specific data packet through the second channel time block, wherein the bi-directional channel time block is predetermined to be allocated in an unreserved region in a superframe.

15 Claims, 10 Drawing Sheets

U.S. PATENT DOCUMENTS

| | | | |
|---|---|---|---|
| 2008/0212559 A1* | 9/2008 | Mahesh et al. | 370/345 |
| 2010/0128679 A1* | 5/2010 | Kwon | 370/329 |

FOREIGN PATENT DOCUMENTS

| | | |
|---|---|---|
| JP | 2006270248 | 10/2006 |
| KR | 10-2005-0073709 | 7/2005 |
| KR | 1020070022566 | 2/2007 |
| KR | 1020070111723 | 11/2007 |
| WO | 02/054791 | 7/2002 |
| WO | 2004/103009 | 11/2004 |
| WO | 2006/104341 | 10/2006 |
| WO | 2006138379 | 12/2006 |

* cited by examiner

METHOD FOR TRANSMITTING A DATA PACKET AND A METHOD OF ALLOCATING A CHANNEL IN A WIRELESS NETWORK

CROSS-REFERENCE TO RELATED APPLICATIONS

This application is a 35 U.S.C. §371 filing of International Appln. Ser. No. PCT/KR2008/000541, filed Jan. 29, 2008. Pursuant to 35 U.S.C. §119(a), this application claims the benefit of earlier filing date and right of priority to Korean Application Nos. 10-2007-0062892, filed on Jun. 26, 2007 and 10-2007-0089425, filed Sep. 4, 2007, the contents of all of which are incorporated by reference herein in their entirety. This application further claims the benefit of U.S. Provisional Appln. Ser. No. 60/888,052, filed on Feb. 2, 2007, the contents of which is hereby incorporated by reference herein in its entirety.

TECHNICAL FIELD

The present invention relates to a wireless network, and more particularly, to a method for transmitting a data packet and Method of allocating a channel in a wireless network.

BACKGROUND ART

Recently, with communication, computer and networking technology having been developed, a various kinds of network are developed and thereby, they are materialized in real life.

For example, there are a large-scaled network which connects all over the world like a wire/wireless Internet, and a small-scaled network which allows audio or video data to be exchanged between devices by configuring a wire/wireless network between a relatively small number of digital devices in limited places such as homes or small-scaled companies. By developing network, interfacing technology which allows network-to-network communication or device-to-device communication becomes also various.

A device transmits a Bandwidth Request command to a coordinator to be allocated channel resource to transmit data in a network. Then, the coordinator checks whether allocable channel resource for the device remains or not and allocates requested channel resource to the device if could. At this time, allocation information for the allocated channel resource form example, timing allocation information is transmitted to devices in the network through a beacon.

Generally a reserved region by the channel allocation method in a channel is used for transmitting a command, a data stream, or an asynchronous data. And an un-reserved region in the channel is user for transmitting control information for between a coordinator and a device or between devices, MAC command, or asynchronous data.

For general data stream or command transmitting, aforesaid channel allocation method can be useful. But, if there is a specific limit condition, which could be a specific time limit to transmit a message from a device to another device and to receive a response for message, other channel allocation method may be needed.

DISCLOSURE

Technical Problem

An object of the present invention devised to improve the above mentioned background art lies on providing to a method for transmitting a data packet through a channel allocation method under a specific limit condition.

Technical Solution

The object of the present invention can be achieved by providing a method for transmitting a data packet in a wireless network, the method comprising: requesting to allocate a bi-directional channel time block including a first channel time block for transmitting a specific data packet and a second channel time block for receiving a response to the specific data packet; transmitting the specific data packet through the first channel time block; and receiving the response to the specific data packet through the second channel time block, wherein the bi-directional channel time block is predetermined to be allocated in an unreserved region in a superframe.

Here, the unreserved region may be retained to be free for the specific data packet.

Here, the unreserved region may be is used as contention-based region if there is no request to allocate for the specific data packet.

Here, the specific data packet may be associated with a Round Trip Time (RTT)_TEST.

Here, the bi-directional channel time block may be allocated by considering a round trip time that the specific data packet is transmitted and the response to the specific data packet is received.

The method may further comprise receiving the specific data packet from an upper layer.

Here, the upper layer is one of an AVC protocol layer and a digital transmission content protection (DTCP) layer.

In another aspect of the present invention, provided herein is a method for transmitting a data packet in a wireless network, the method comprising: simultaneously reserving a first transport block for transmitting a first data packet and a second transport block for receiving a second data packet; transmitting the first data packet through the first transport block; and receiving the second data packet through the second transport block, wherein at least one schedule period of the first transport block and the second transport block is determined based on a time interval that the first data packet is transmitted and the second data packet is received within.

Here, the first transport block and the second transport block may be predetermined to be allocated in an unreserved region which is retained to be free for the first data packet and the second data packet in a superframe.

Here, the unreserved region may be used as contention-based region if there is no reservation for the first data packet and the second data packet.

Here, each of the first data packet and the second data packet is associated with an authentication key value.

Here, the second transport block may be adjacent to the first transport block.

Here, the at least one schedule period may include a maximum schedule period and a minimum schedule period.

In another aspect of the present invention, provided herein is a method for allocating communication channel in wireless HD system including a coordinator and at least one device, the method comprising: transmitting from a first device to the coordinator, a request command to allocate both a first channel for transmitting a first message and a second channel for receiving a second message; receiving from the coordinator, a response to the request command; transmitting to a second device, a first message through the first channel; and receiving from the second device, the second message through the second channel.

Here, the first channel and the second channel may be allocated by considering a time limit that the first message is transmitted and the second message is received within.

Here, the first message may be a Round Trip Time (RTT)_TEST command and the second message is a RTT_TEST response command.

The method may further comprise measuring round trip time between the first message and the second message; and transmitting information of the round trip time to an upper layer.

Here, the upper layer may be one of an AVC protocol layer and a digital transmission content protection (DTCP) layer.

ADVANTAGEOUS EFFECTS

According to the present invention described in here, channel resource can be guaranteed under the condition in which there is a time limit for transmitting/receiving a specific message. And, the time limit condition can be satisfied more stably. And, a delay of the specific message can be reduced.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

The embodiments described below are examples in which the technical features of the invention are applied to a wireless video area network (WVAN) which is a type of wireless network. WVAN is a wireless network which provides a throughput of more than 4.5 Gbps so that 1080p A/V streams can be transmitted without compression in a local area of less than 10 m using a frequency band of 60 GHz.

Figure 1:
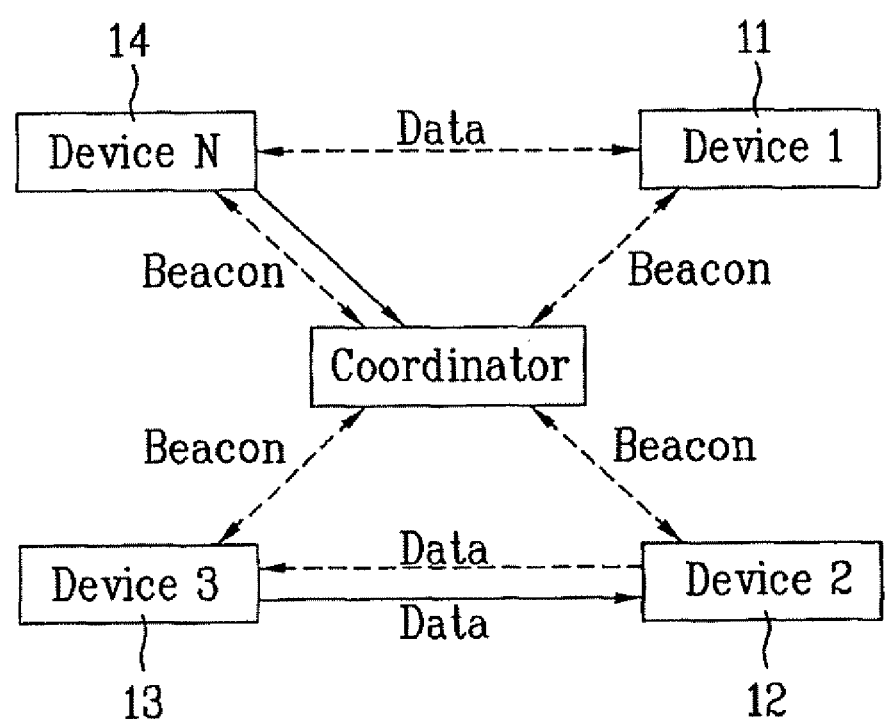
FIG. 1 illustrates an example WVAN constructed of a number of devices.

FIG. 1 illustrates an example WVAN constructed of a number of devices.

The WVAN is a network constructed for data exchange between devices located in a specific space. The WVAN is constructed of two or more devices 10 to 14, one of which operates as a coordinator 10. When a wireless network is constructed of devices, the coordinator 10 is a device which functions to allocate and schedule wireless resources so as to allow the devices to share wireless resources without collisions.

The coordinator 10 allocates and schedules wireless resources and periodically transmits a message including scheduling information to inform each device of the scheduling. In the following description, this message is referred to as a beacon.

And of course the coordinator has a function to transmit and receive data through at least one channel as a normal device, in addition to the function to allocate resources to allow devices in the network to perform a communication. The coordinator also has functions such as clock synchronization, network association, and bandwidth resource maintenance.

The WVAN supports two types of physical (PHY) layers. That is, the WVAN supports a high-rate physical (HRP) layer and a low-rate physical (LRP) layer. The HRP layer is a physical layer which supports a data transfer rate of higher than 1 Gb/s and the LRP layer is a physical layer which supports a data transfer rate of 1-10 Mb/s.

The HRP layer is highly directional and is used for transmission of isochronous data streams, asynchronous data, MAC commands, and A/V control data through unicast connections. The LRP layer supports directional or omni-directional modes and is used for transmission of beacons, asynchronous data, and MAC commands including beacons through unicasting or broadcasting.

HRP and LRP channels share a frequency band and are separately used through a TDM method. The HRP layer uses four channels, each having a bandwidth of 2.0 GHz, in a band of 57-66 GHz and the LRP layer uses three channels, each having a bandwidth of 92 MHz, in the band.

Figure 2:
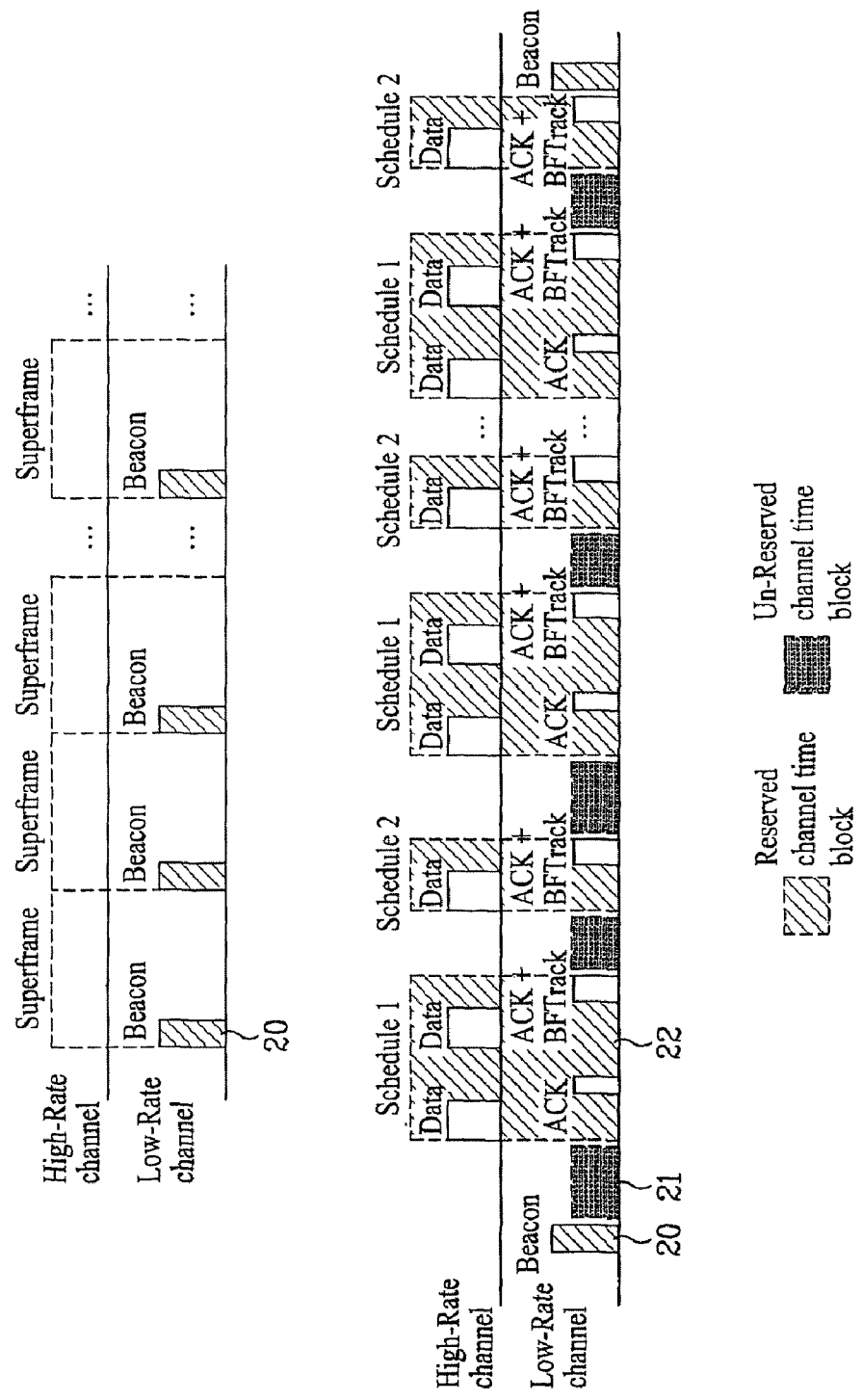
FIG. 2 illustrates an example superframe structure used in the WVAN.

FIG. 2 illustrates an example superframe structure used in the WVAN.

As shown in FIG. 2, each superframe includes a region in which a beacon is transmitted, a reserved CTB (Channel Time Block) region 22, and an unreserved CTB region 21. Each region comprises at least one CTB (channel time block). And, each CTB is time-divided into an HRP region in which data is transmitted through HRP and an LRP region in which data is transmitted through LRP.

The beacon 20 is transmitted periodically by the coordinator. Through the beacon 20, it is possible to identify the beginning of each superframe. The beacon includes scheduled timing information and WVAN management/control information. Devices can exchange data over the network through the timing information and the management/control information included in the beacon. When the coordinator has allocated a channel time to a device in response to a channel time allocation request from the device, the device can use the HRP region to transmit data to another device.

The reserved CTB region 22 is used to allow a device, to which a channel time is allocated by the coordinator in accordance with a channel time allocation request of the device, to transmit data to another device. Commands, data streams, asynchronous data, etc. can be transmitted through the reserved CTB region 22. If a specific device transmits data to another device through the reserved region, the HRP channels may be used. If a device which receives data transmits an acknowledgement or negative acknowledgement (ACK/NACK) signal in response to the received data, the LRP channels may be used.

The unreserved CTB region 21 can be used to transmit control information, MAC command or asynchronous data between the coordinator and the device or between the devices. To avoid data collision between the devices in unreserved CTB region 21, a carrier sense multiple access (CSMA) mode or a slotted Aloha mode can be used. In unreserved CTB region 21, data can be transmitted through the LRP channels only. If there are provided a lot of commands or control information to be transmitted, a reserved CTB region 22 may be set in the LRP channels. The length and the number of reserved regions and unreserved regions in each superframe may depend on superframe and may be controlled by the coordinator.

Although not illustrated in FIG. 2, the superframe may include a contention-based control period (CBCP), which is located subsequent to the beacon, to transmit an urgent control/management message. It could be included in the unreserved CTB region 21. The length of the CBCP is set to be less than a preset threshold mMAXCBCPLen.

Figure 3:
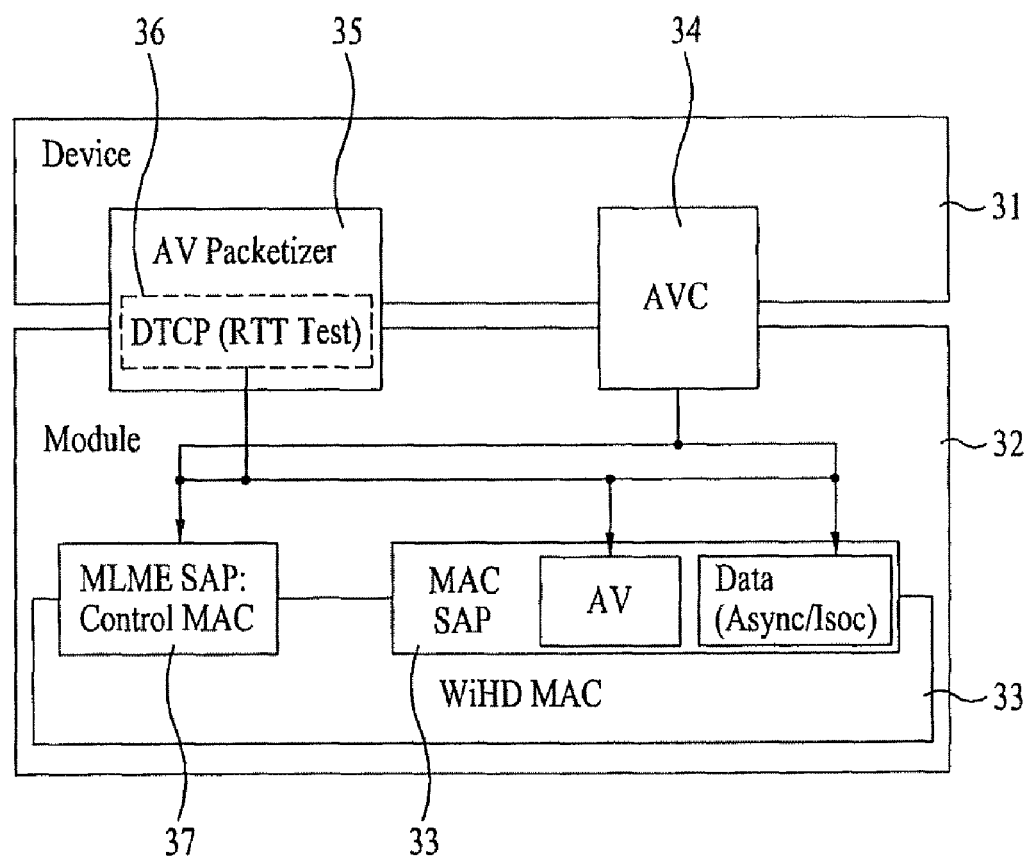
FIG. 3 illustrates an example protocol layer structure implemented in a device in the WVAN.

FIG. 3 illustrates an example protocol layer structure implemented in a device in the WVAN.

As shown in FIG. 3, each device 31 included in the WVAN has a communication module 32 which can be divided into two or more layers according to its functions. Generally, the communication module 32 includes a PHY layer (not shown), a MAC layer 33, an adaptation layer, and a station management entity (SME) (not shown). The adaptation layer includes at least two protocols including an AVC protocol 34 and an AV packetizer 35.

The AVC protocol 34 can perform functions such as device control, connection control, device features, and device capabilities. The AV packetizer 35 can perform a function to construct AV data to provide an HRP data service.

Each of the layers can provide a high rate data service, a low rate data service, and a management service. The high rate data service supports video, audio, and data transfer. The low rate data service supports audio data, MAC commands, and a small amount of asynchronous data. The SME (not shown) is a layer-independent entity. The SME collects device (station) status information of each layer and controls lower layers. The SME can also perform an interface function between a host and a wireless device.

Each layer also includes a layer management entity. An entity which manages the MAC layer is referred to as a MAC layer management entity (MLME) and an entity which manages the PHY layer is referred to as a PHY layer management entity (PLME). A message exchanged between different layers is referred to as a primitive. The above communication module is referred to as a modem.

Examples of primitives which can be used for communication through services access points (SAPS) 37 and 38 include request, indication, response, and confirm primitives.

The request primitive is used to request a process from the management entity. The indication primitive is used to inform the management entity of changes of states of a local lower layer that are not caused by reception of information or a request from a peer management entity or a request from an upper layer. The response primitive is used to respond to a request from a peer management entity. The confirm primitive is used to inform the management entity of results of a previous request.

The protocol layer may further include a layer for security and authentication of data transfer, for example, a digital transmission content protection (DTCP) layer 36. The DTCP layer 36 can perform functions to exchange key values for authentication, to perform authentication through the key values by ciphering and transmit the values. Although the following description is given based on the DTCP layer 36 as the layer for security and authentication, those skilled in the art will appreciate that any other layer with the same or similar function can be used regardless of its name.

In the following description, each device, which transmits or provides output data, is referred to as a source device and each device, which receives the output data and outputs it according to its function, is referred to as a sink device.

The embodiments applied to RTT_TEST (Round Trip Time TEST) for DTCP-IP (Supplement E DTCP Mapping to IP) in WiHD (wireless HD) system are described below. DTCP (Digital Transmission Content Protection) protocol is for preventing illegal reproduction during playing and transmitting of video stream and the International Standard, for example, "Digital Transmission Content Protection Specification Vol. 1 and Vol. 2" is defined.

DTCP protocol is developed for IEEE 1394 cable therefore, AL (Additional Localization) process is needed additionally for IP (Internet Protocol) of home network as WiHD. The Most significant reasons for adding AL process are that there is a need for limiting usable distance by enlarging DTCP protocol usage from IEEE 1394 cable to home network and that there is no device ID (identifier) of the sink device stored in the source device.

The source and/or sink devices can check a round trip time via RTT_TEST to determine whether or not the round trip time is greater than a preset threshold. And, the source device can store a device ID of the sink device in a storage portion of the source device, set a timer to allow data such as content to be transmitted within a specific time, check the round trip time, and exchange a key value depending on whether or not the round trip time is greater than the preset threshold. Preferably, the source device can exchange the key value only when the round trip time is not greater than the preset threshold.

RTT_TEST may be performed for confirming that a sink device which receives data stream from a source device is authenticated. A process for exchanging AKE (Authentication Key) between the sink device and the source device can be included in the RTT_TEST. With starting the RTT_TEST, messages for preparing the RTT_TEST are exchanged between the sink device and the source device. And then, the source device transmits a cipher parameter 'N' via RTT_SETUP(N)_CMD message to the sink device.

The source device can calculate MAC1A, MAC2A and the sink device can calculate the MAC1B and MAC2B using the cipher parameter 'N' according to Expression 1 and Expression 2 as below.

$$MAC1A=MAC1B=[SHA-1(MK+N)]msb80 \qquad \text{[Expression 1]}$$

$$MAC2A=MAC2B=[SHA-1(MK+N)]lsb80 \qquad \text{[Expression 1]}$$

The sink device transmits ACCEPTED(N)_RSP message to the source device in response to the RTT_SETUP(N)_CMD message. Then, the source device transmits the calculated MAC1A to the sink device via RTT_TEST(MAC1A)_CMD message and the sink device transmits the calculated MAC2B to the sink device via ACCEPTED(MACK2B)_RSP message.

And, the source device compares received MAC2B and calculated MAC2A and the sink device compares received MAC1A and calculated MAC1B. After that, if the sink device is authenticated, the source device adds the sink device to RTT registry.

For RTT_TEST, time limit can be set to time interval from time that the source device transmits the RTT_TEST (MAC1A)_CMD message to the sink device to time that the source device receives ACCEPTED(MACK2B)_RSP message from the sink device and the time interval can be 7 ms.

In this case, the source device transmits the RTT_TEST (MAC1A)_CMD message to the sink device and receives ACCEPTED(MACK2B)_RSP message from the sink device within 7 ms. If the source device can not receives ACCEPTED(MACK2B)_RSP message within 7 ms after transmitting the RTT_TEST(MAC1A)_CMD message, the source device may restart the RTT_TEST from transmitting the RTT_TEST(MAC1A) CMD message.

Figure 4:
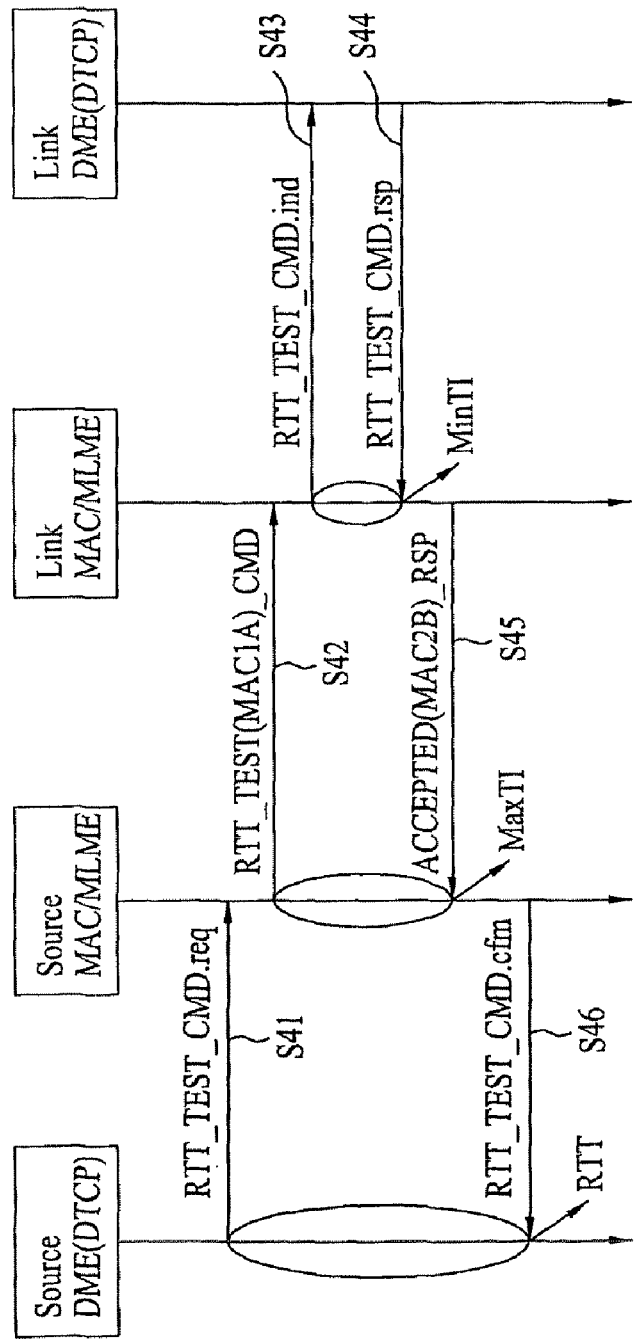
FIG. 4 illustrates an example of method for transmitting and receiving RTT_TEST CMD message and ACCEPTED_RSP message during RTT_TEST.

FIG. 4 illustrates an example of method for transmitting and receiving RTT_TEST(MAC1A)_CMD message and ACCEPTED(MAC2B)_RSP message during RTT_TEST.

In FIG. 4, layer or entity for DTCP-IP is embodied in a source device and a sink device of WVAN. The layer or entity for DTCP-IP can be embodied by being included in DME of the source device and sink device or can be embodied by separate upper layer or entity. In FIG. 4, it is assumed that the layer or entity for DTCP-IP can be embodied by being included in DME of the source device and sink device.

Referring to FIG. 4, the DME of the source device transfers RTT_TEST_CMD.req primitive to the MAC/MLME of the source device to instruct that the RTT_TEST(MAC1A)_CMD message is transmitted (S41). The MAC/MLME of the source device transmits the RTT_TEST(MAC1A)_CMD message to the sink device (S42). The MAC/MLME of the sink device transfers RTT_TEST_CMD.ind primitive to the DME of the sink device to inform that the RTT_TEST (MAC1A)_CMD message is received (S43).

The DME of the sink device transfers RTT_TEST_CMD.rsp primitive to the MAC/MLME of the sink device to instruct that the ACCEPTED(MAC2B)_RSP message is transmitted in response to the RTT_TEST(MAC1A)_CMD message (S44). The MAC/MLME of the sink device transmits the ACCEPTED(MAC2B)_RSP message to the source device (S45). The MAC/MLME of the source device transfers RTT_TEST_CMD.cfm primitive to the DME of the source device to inform that the ACCEPTED(MAC2B)_RSP message is received (S46).

In FIG. 4, "RTT" can be defined as time limit for the DME of the source device to transfer the RTT_TEST_CMD.req primitive and to receive the RTT_TEST_CMD.cfm primitive. Or, "RTT" can be defined as time limit for MAC/MLME of the source device transmits the RTT_TEST_CMD message and to receive ACCEPTED_RSP message. Or, "RTT" can be defined as time limit for the MAC/MLME of the sink device to transmit the RTT_TEST_CMD.ind primitive and to receive the RTT_TEST_CMD.rsp primitive.

In here, it is assumed that the RTT is defined to time limit for the DME of the source device to transfer the RTT_TEST_CMD.req primitive and to receive the RTT_TEST_CMD.cfm primitive and set to be 7 ms.

Under this assumption, 'MaxTI' can be defined as the maximum time interval for the MAC/MLME of the source device transmits the RTT_TEST(MAC1A)_CMD message and to receive ACCEPTED(MAC2B)_RSP message with in the RTT of 7 ms. The MaxTI can be determined by considering with the RTT and data processing time for transmitting message from the source device. And, 'MinTI' can be defined as the minimum time interval for the MAC/MLME of the sink device to transmit the RTT_TEST_CMD.ind primitive and to receive the RTT_TEST_CMD.rsp primitive.

In FIG. 4, it is preferable that a channel resource that the source device transmits the RTT_TEST(MAC1A)_CMD message and the source device receives ACCEPTED (MAC2B)_RSP message is guaranteed for the DME of the sink device to receive RTT_TEST_CMD.cfm primitive within RTT. And the channel resource is determined with having a time interval between the MaxTI and the MinTI. It is sure that the RTT can be determined as same with the MaxTI or the MinTI according to the definition of the RTT.

Figure 5:
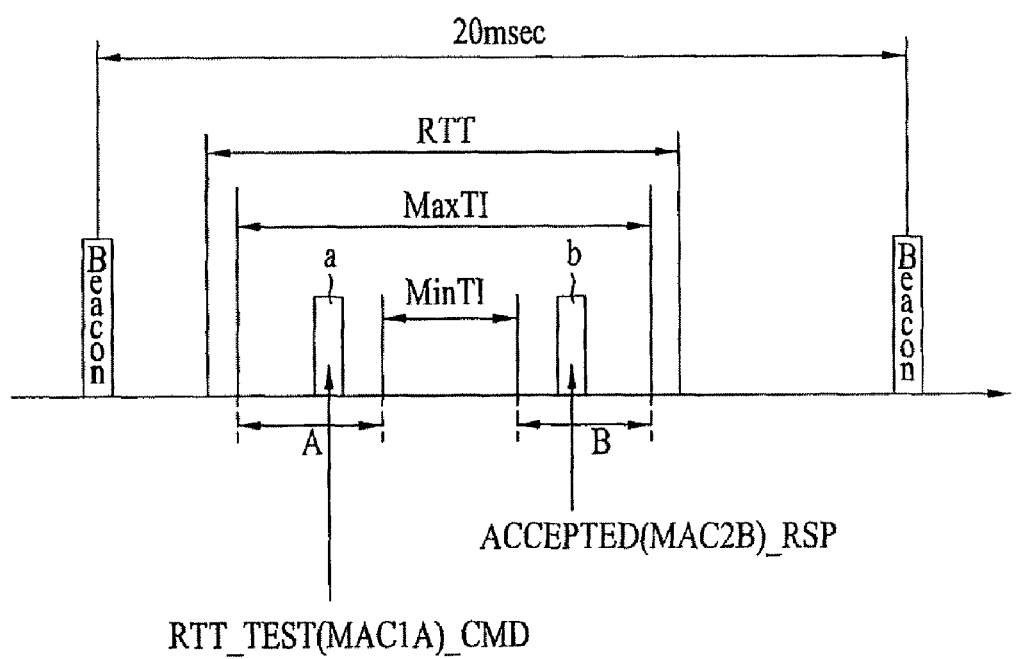
FIG. 5 an exemplary superframe illustrating a method for transmitting and receiving RTT_TEST_CMD message and ACCEPTED_RSP message during RTT_TEST.

FIG. 5 an exemplary superframe illustrating a method for transmitting and receiving RTT_TEST(MAC1A)_CMD message and ACCEPTED(MAC2B)_RSP message during RTT_TEST.

The length of the superframe is assumed as 20 ms. In FIG. 5, to satisfy a condition of the RTT, a source device transmits the RTT_TEST(MAC1A)_CMD message to a sink device within 'A' and receive the ACCEPTED(MAC2B)_RSP message from the sink device within 'B'.

If the RTT_TEST(MAC1A)_CMD message and ACCEPTED(MAC2B)_RSP message are transmitted by contention-based allocation method, it can not be guaranteed that the condition of the RTT is satisfied. Therefore, it is preferable that the channel resource, which is for RTT_TEST between the source device and the sink device, is pre-allocated. A continuous channel resource that is, continuous pluralities of CTBs can be allocated on the condition of RTT. But, this continuous channel resource can lead to waste of channel resource.

According to the embodiment of the invention, a first channel resource (a) for transmitting the RTT_TEST(MAC1A)_CMD message and a second channel resource (b) for transmitting the ACCEPTED(MAC2B)_RSP message are allocated. The second channel resource (b) is separated from the first channel resource (a). And the first channel resource (a) and the second channel resource (b) can be consisted of one or more CTB in WVAN.

Figure 6:
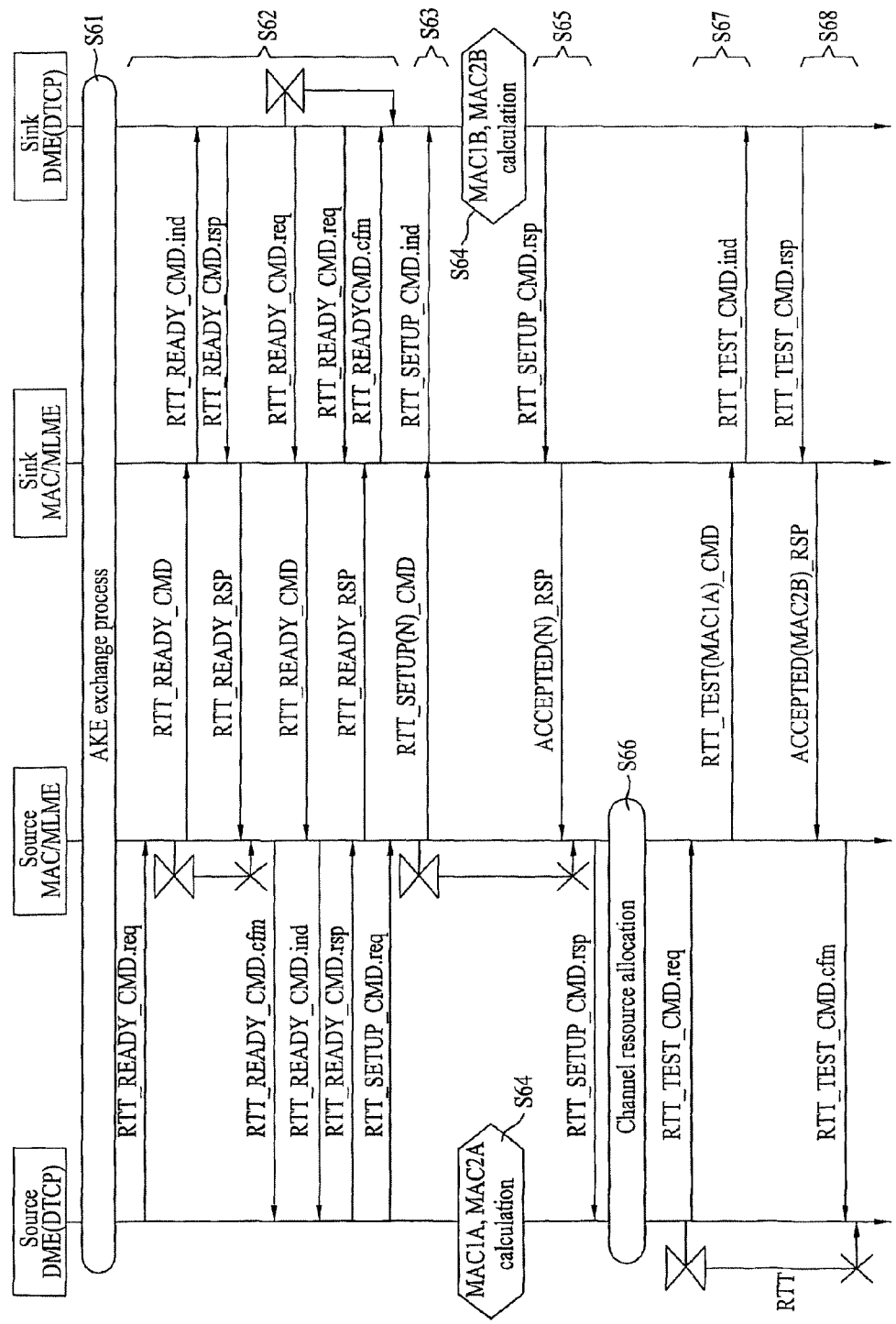
FIG. 6 is a flow chart illustrating an embodiment of the invention.

FIG. 6 is a flow chart illustrating an embodiment of the invention.

In FIG. 6, a process to exchange AKE between a source device and a sink device (S61), steps to exchange messages for RTT_TEST between the source device and the sink device (S62), a step to transmit RTT_SETUP(N)_CMD message (S63), a step to calculate MAC1A, MAC2A and MAC 1B, MAC 2B in the source device and the sink device, respectively (S64), and a step to transmit ACCEPTED(N)_RSP message (S65) are same with the method for transmitting and receiving RTT_TEST_CMD message and ACCEPTED_RSP message during RTT_TEST related with FIG. 4.

Several steps to transfer primitives between the source device and the sink device are added in FIG. 6 with comparing with FIG. 4.

The source device performs a process to allocate channel resources requested for transmitting the RTT_TEST (MAC1A)_CMD message and the ACCEPTED(MAC2B)_RSP message (S66). The process to allocate channel resources (S66) can be performed between the source device and a coordinator of WVAN. The channel allocation method (S66) is described in details with FIG. 7.

After the process to allocate channel resources, a first channel resource and a second channel resource are allocated to the source device for RTT_TEST. Then, the source device transmits the RTT_TEST(MAC1A)_CMD message via the first channel resource (S67). The sink device receives the RTT_TEST(MAC1A)_CMD message and transmits the ACCEPTED(MAC2B)_RSP message via the second channel resource in response to the RTT_TEST(MAC1A)_CMD message (S68).

The sink device can achieve allocation information of the second channel resource for transmitting the ACCEPTED (MAC2B)_RSP message through receiving beacon broadcasted by the coordinator.

Figure 7:
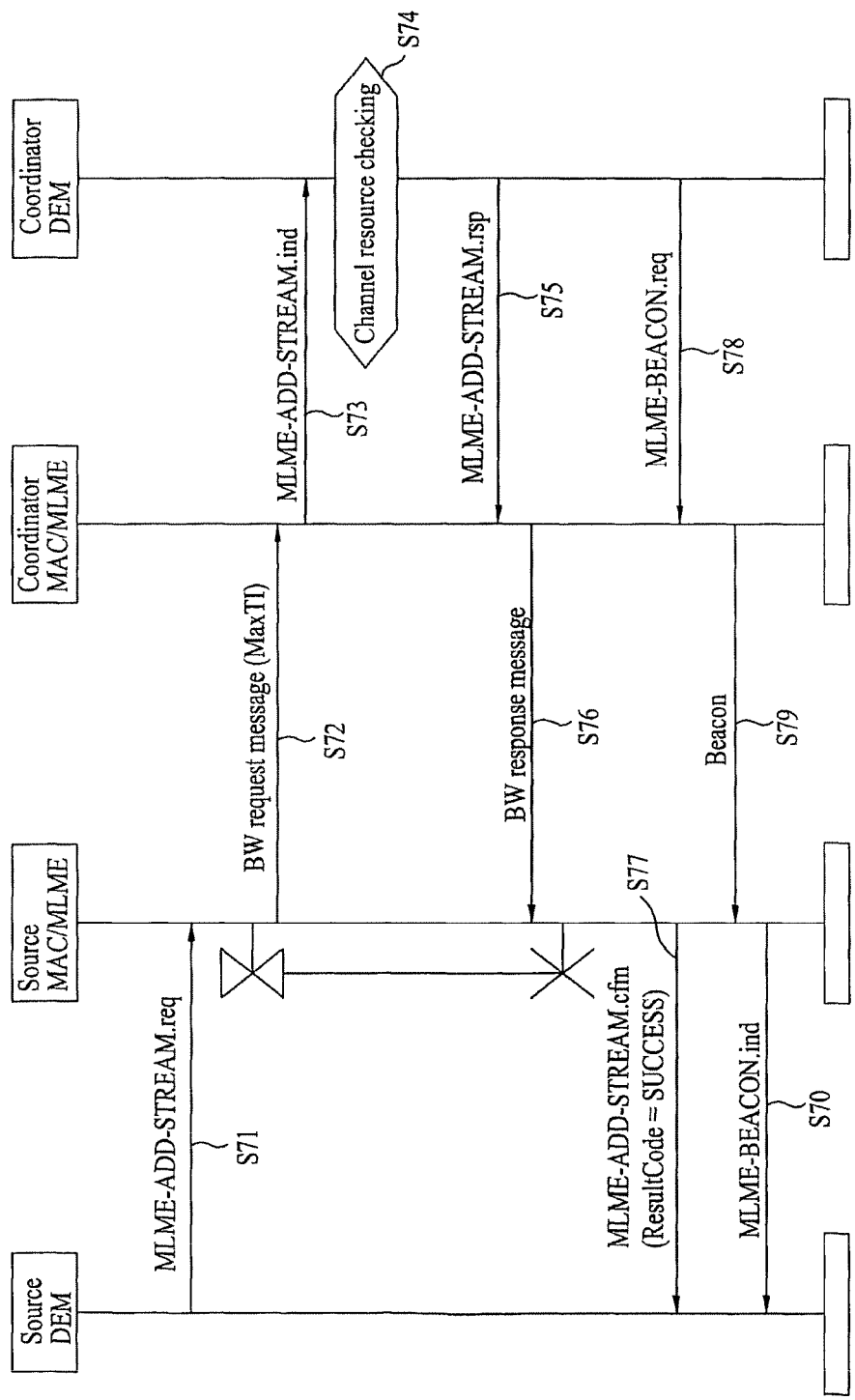
FIG. 7 is a flow chart illustrating a channel allocation method (S66) in the embodiment of the invention of FIG. 6.

FIG. 7 is a flow chart illustrating the channel allocation method (S66) in the embodiment of the invention of FIG. 6.

Referring to FIG. 7, DME of the source device instruct to request channel allocation for the RTT_TEST(MAC1A)_CMD message and ACCEPTED(MAC2B)_RSP message by transferring MLME-ADD-STREAM.req primitive to MAC/MLME of the source device (S71). The MAC/MLME of the source device can transmit BW (bandwidth) request command to the coordinator (S72).

The BW request command includes information informing that requested channel resources are for the RTT_TEST that is, RTT_TEST(MAC1A)_CMD message and ACCEPTED (MAC2B)_RSP message.

Table 1 illustrates an example of data format of the BW request command.

TABLE 1

| Octets: 1 | 1 | 12 | ... | 12 |
|---|---|---|---|---|
| command ID | Length | BW request item 1 | ... | BW request item n |

Table 2 illustrates an example of data format of the 'BW request item' field in the Table 1.

TABLE 2

| Octets: 1 | 1 | 1 | 1 | 2 | 2 | 2 | 1 |
|---|---|---|---|---|---|---|---|
| Target ID | Stream request ID | Stream Index | Number of time blocks | Time block duration | Minimum Schedule Period | Maximum Schedule Period | Request Control |

In table 2, a 'Schedule Period' field contains the time between the start of two consecutive time blocks belonging to the same schedule. The Schedule Period can be informed by Minimum Schedule Period and Maximum Schedule Period.

Table 3 illustrates an example of data format of 'Request Control' field in the Table 2.

TABLE 3

| Bits: 3 | 1 | 1 | 1 | 1 | 1 |
|---|---|---|---|---|---|
| Priority | Static Request | PHY mode | Beam formed | Bi-directional | Reserved |

In table 3, a 'Bi-directional' field indicates that the requested channel resource is bi-directional channel resource including a first channel resource and a second channel resource for transmitting and receiving of message, respectively. For example, if the 'Bi-directional' field is set to '1', requested channel resource is bi-directional channel resource and if the 'Bi-directional' field is set to '0', requested channel resource is a continuous channel resource. The opposite case could be.

The MAC/MLME of the coordinator transfers MLME-ADD-STREAM.ind primitive to DME of the coordinator to inform reception of the BW request command from the source device (S73). The DME of the coordinator checks whether the requested channel resource that is, the first channel resource and the second channel resource can be allocated to the source device (S74) and determines to allocate the requested channel resources.

In a superframe of WVAN, location, spacing and period of the first channel resource and the second channel resource can be preset as fixed value. For example, the information associated with the location, the spacing and the period of the first channel resource and the second channel resource can be shared by signaling of the coordinator when a specific WVAN is generated.

In this case, if there is a request for the allocation of the first channel resource and the second channel resource, the coordinator broadcasts a beacon including information whether the predetermined the first channel resource and the second channel resource are allocated to a specific device or not.

And then, the specific device uses the allocated first channel resource and the second channel resource without additional information for channel resource, for example, information associated with the location, the spacing and the period of the first channel resource and the second channel resource.

In case that the first channel resource and the second channel is predetermined, if the first channel resource and the second channel are not allocated to the specific device, the first channel resource and the second channel can have another usage, for example, contention-based CTB.

In FIG. 7, the DME of the coordinator transfers MLME-ADD-STREAM.rsp primitive to the MAC/MLME of the coordinator to inform that requested channel resource is allocable (S75). The MAC/MLME of the coordinator transmits BW response command that 'Reason code' field is set to 'SUCCESS' to MAC/MLME of the source device (S76). The MAC/MLME of the source device transfer MLME-ADD-STREAM.cfm that 'Reason code' field is set to 'SUCCESS' to DME of the source device (S77).

The DME of the coordinator transfers MLME-BEACON.req primitive to the MAC/MLME of the coordinator for broadcasting beacon associated with the superframe (S78). And the MAC/MLME of the coordinator broadcasts the beacon to the WVAN (S79).

The beacon includes allocation information for a whole channel resource of the superframe including the first channel resource and the second channel resource. The allocation information related with the first channel resource and the second channel resource can be information whether the first channel resource and the second channel resource are allocated to a specific device or not.

Table 4 illustrates an example of data format of a beacon of a superframe.

TABLE 4

| Octets: 8 | 2 | 1 | variable | ... | variable | 4 |
|---|---|---|---|---|---|---|
| MAC control header | Beacon control | RATB end time | IE1 | ... | IEn | PCS |

Information related with channel allocation of each device of WAN is included as a format of the 'Reserved Schedule IE' in the beacon. Table 5 illustrates an example of data format of 'Reserved Schedule IE' included in a beacon of a superframe.

TABLE 5

| Octets: 1 | 1 | 8 | 8 | ... | 8 |
|---|---|---|---|---|---|
| IE index | IE length | Schedule block 1 | Schedule block 2 | ... | Schedule block n |

Table 6 illustrates an example of data format of the 'Schedule block' field of table 5.

TABLE 6

| Octets: 2 | 1 |
|---|---|
| Schedule info | Stream index |

In Table 6, a 'Stream index' field includes information indicating stream corresponding with channel resource allocation.

Table 7 illustrates an example of data format of the 'Schedule info' field of table 6.

TABLE 7

| Bits: 6 | 6 | 1 | 1 | 1 | 1 |
|---|---|---|---|---|---|
| SrcID | DestID | Static | PHY mode | Beam formed | Bi-directional |

In Table 7, a 'SrcID' field includes identifier (ID) of a source device which channel resource is allocated to. And, a 'DestID' field includes identifier (ID) of a corresponding sink device.

A 'Static Request' field can be used to indicate whether or not to make a static allocation request. For example, when a static allocation request is made, a value of "1" can be inserted into the Static Request field to be transmitted. When a dynamic allocation request is made, a value of "0" can be inserted into the Static Request field to be transmitted.

A 'PRY Mode' field can be used to indicate whether or not to make an HRP/LRP allocation request. For example, when an HRP allocation request is made, a value of "1" can be inserted into the PHY Mode field to be transmitted and, when an LRP allocation request is made, a value of "0" can be inserted into the PHY Mode field to be transmitted.

A 'Beam Formed' field can be used to indicate whether or not to request allocation using beam forming. For example, when allocation using beam forming is requested, a value of "1" can be inserted into the Beam Formed field to be transmitted. Otherwise, a value of "0" can be inserted into the Beam Formed field to be transmitted.

And, a 'Static' field indicates that a corresponding schedule block is allocated by static schedule or dynamic schedule, 'PRY mode' field indicates which one of HRP mode and LRP mode is used. 'Beam formed' field indicates whether beam forming is used or not.

And, a 'Bi-directional' field indicates whether requested channel resources of a first channel resource and a second resource are allocated or not.

When the beacon is received to the source device, the MAC/MLME of the source device transfers MLME-BEACON.ind primitive to DME of the source device (S790).

Figure 8:
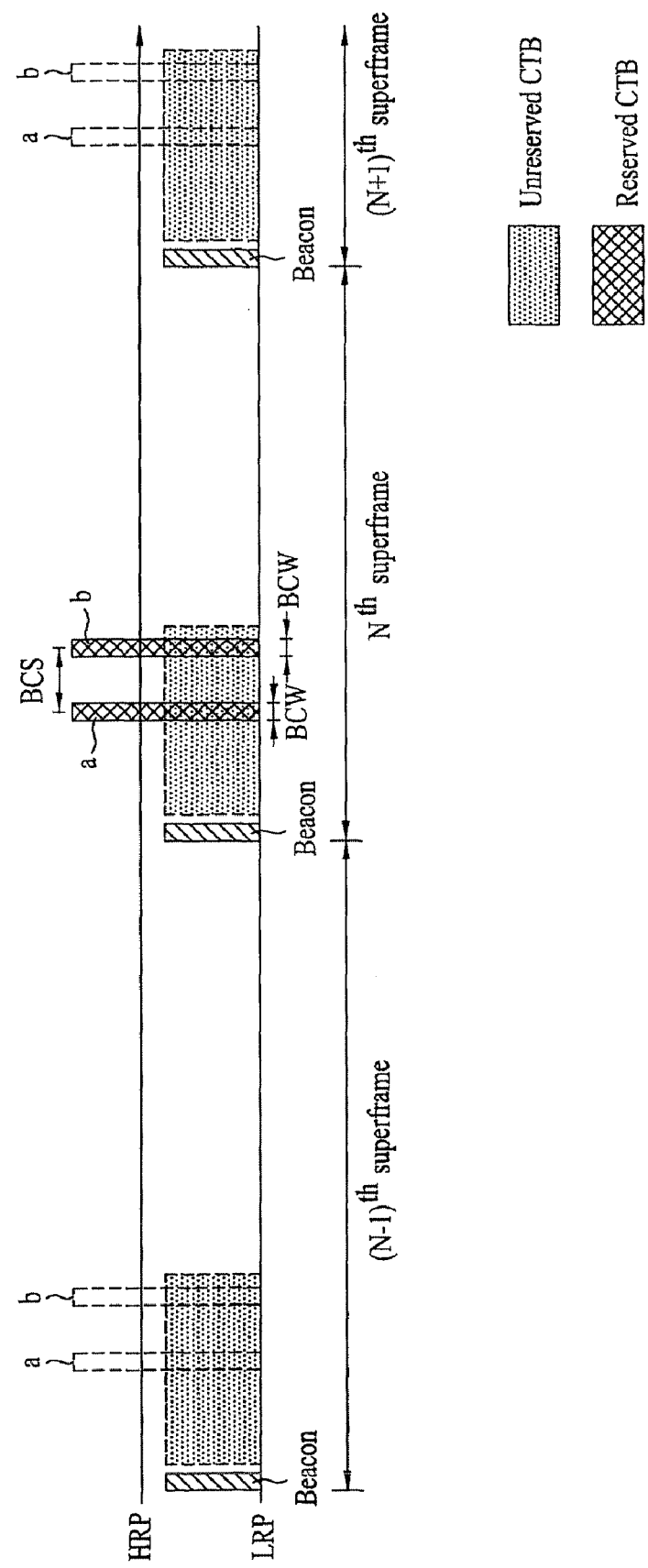
FIG. 8 is an exemplary superframe illustrating an embodiment of the invention.

FIG. 8 is an exemplary superframe illustrating an embodiment of the invention.

In FIG. 8, location, arrangement, spacing and period length which are associated with a bi-directional channel resource of a first channel resource and a second resource, can be predetermined with fixed value. And, the predetermined first channel resource and second resource are retained to be free for a specific data packet. Preferably, first channel resource and second resource are adjacent to each other.

The bi-directional channel resource of the first channel resource and the second resource can have another usage if it is not allocated to a specific device in a corresponding superframe.

That is, referring to FIG. 8, a first channel resource (a) and a second resource (b) of a (N−1)th superframe and a (N+1)th superframe are not allocated for a specific message transmission of a specific device. In this case, the first channel resource and the second resource can be used by any device including the specific device as a general unreserved CTB region.

Meanwhile, referring to FIG. 8 a first channel resource (a) and a second resource (b) of a (N)th superframe are allocated for a specific message transmission of a specific device. In this case, the first channel resource and the second resource can be used only by the specific device for the specific message transmission.

In FIG. 8, a time interval (BCW) of each of the first channel resource and the second resource preferably may be larger than. MinTI and smaller than MaxTI.

Figure 9:
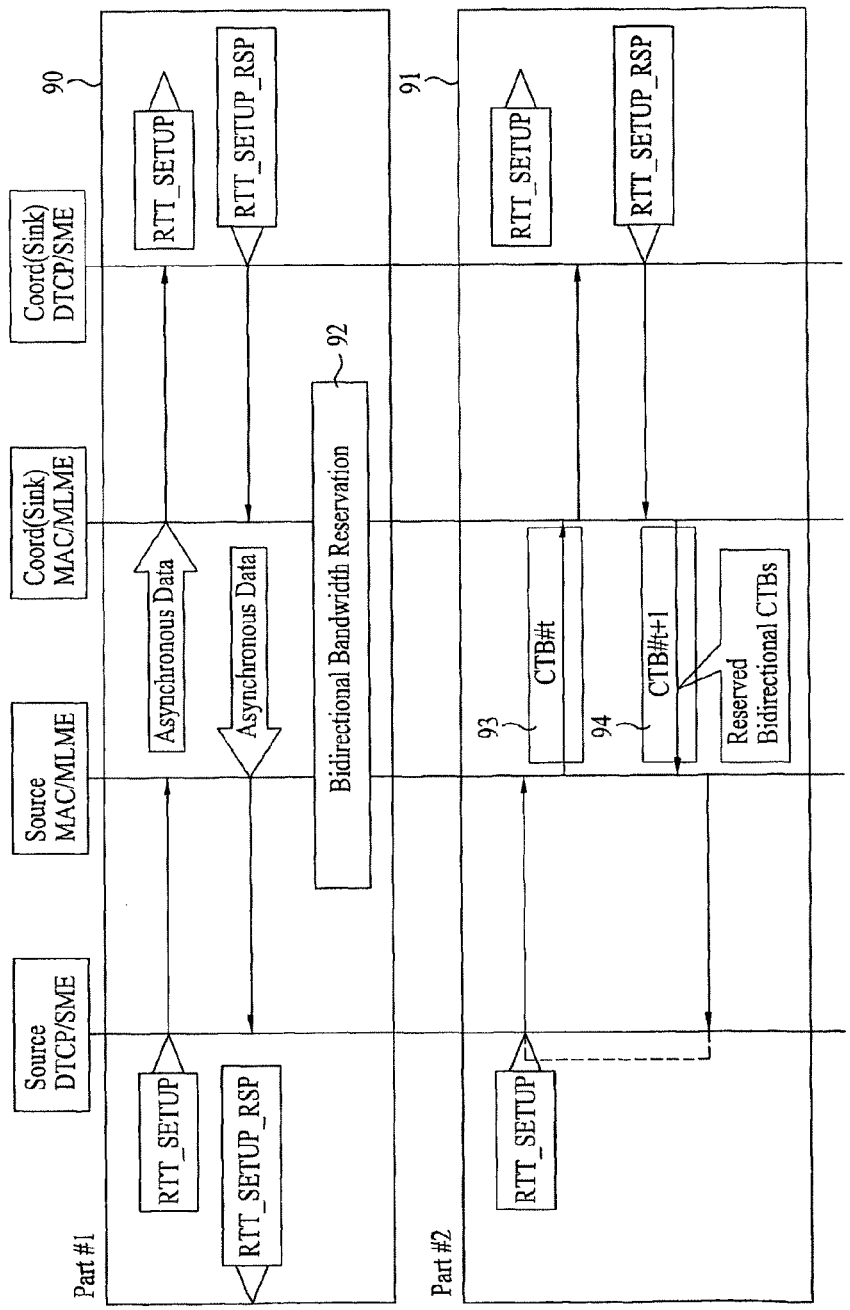
FIG. 9 illustrates the embodiment of the invention.

FIG. 9 illustrates the embodiment of the invention.

An example method, which takes into consideration the queuing delay and channel access delay, will now be described with reference to FIG. 9.

In an example method for reducing the channel access delay, resources (for example, channel time blocks (CTBs)) are allocated for transmission of specific data packets (for example, RTT_TEST data packets) and the RTT_TEST data packet is transmitted through the allocated CTBs.

According to this example, the allocated CTBs for transmission of a specific data packet (for example, RTT_TEST data packets) can be predetermined to be included in an unreserved CTB region of a superframe. That is, if there is a need to transmit the specific data packet via a superframe, the CTB, which is predetermined to be included in an unreserved CTB region of the superframe for several specific data packets, can be used for transmitting the specific data packet.

In other words, as above mentioned in the explanation of the superframe, each superframe has a reserved CTB region and an unreserved CTB region and at least a part of the unreserved CTB region of each superframe can be predetermined for several specific data packet transmissions. Therefore, although a device had not yet pre-reserved for transmitting a specific data packet in a superframe, the device can transmit the specific data packet through the superframe by being allocated CTBs included in the predetermined part of the unreserved region of the superframe.

The CTBs can be predetermined CTBs in an unreserved CTB region of each superframe. Therefore, if there is a request to allocate for the specific data packet, the predetermined CTBs for the specific data packet are allocated by a coordinator. In the meantime, if there is no request to allocate for the specific data packet, the predetermined CTBs for the specific data packet are used as contention based CTB.

In this case, allocation information can only notify a possibility to allocate the predetermined CTBs without allocated CTB information through a beacon broadcasted by the coordinator The allocated CTBs include a first CTB used for transmission and a second CTB used for reception and they may be allocated at the same time. This method can also be referred to as a bi-directional BW allocation method.

In this method, two CTBs, each having an appropriate time interval based on the round trip time or the like, are allocated at once, thereby preventing transmission and reception delay. This is based on the assumption that unidirectional transport is possible through a single continuous CTB. In the case where bi-directional transport is possible through a single CTB, the single CTB may also be allocated provided that the single CTB can guarantee a time interval in consideration of the round trip time.

A procedure for allocating a CTB used for transmitting and receiving an RTT_TEST data packet at a Part #1 (90) will now be described with reference to FIG. 9. If a DTCP layer of a source device transfers an RTT_SETUP data packet for allocating a CTB for transmission/reception of an RTT_TEST data packet to a MAC layer of the source device, then a message or data requesting allocation of a CTB for transmission/reception of an RTT_TEST data packet is transmitted to a coordinator (or sink device).

When receiving the request message, a MAC layer of the coordinator transfers it to a DTCP layer of the coordinator. The DTCP layer of the coordinator checks the request message and allocates the CTB of unreserved CTB region for transmission/reception of an RTT_TEST data packet and sequentially delivers or transmits an RTT_SETUP_RSP data packet, which includes information of the allocated CTB or information of approval or denial of the allocation request, to the MAC layer of the coordinator, the MAC layer of the source device, and the DTCP layer of the source device (92). The source device can acquire the CTB allocation information through the received RTT_SETUP_RSP and can also acquire the CTB allocation information through a beacon that is broadcast thereafter.

Now, reference is made to a procedure for transmitting and receiving an RTT_TEST data packet through a CTB allocated through the above allocation procedure at a Part #2 (91). An RTT_TEST data packet is transmitted and received through the allocated CTBs of CTB#t (93) and CTB#t+1 (94), respectively. In this case, the RTT_TEST data packet can be received within a preset time.

The MAC layer can receive at least one data packet not only from the DTCP layer but also from another upper layer (for example, the AV packetizer layer). In this case, even though a CTB has been allocated for transmission and reception of an RTT_TEST data packet, the allocated CTB cannot be used due to the data packet previously received by the MAC layer since the data packets are transmitted in the order received by the MAC layer.

That is, a queuing delay may occur in this case. For example, the RTT_TEST data packet may not be able to be transmitted using the allocated CTB (i.e., expected CTB) due to the queuing delay during the procedure of the Part #2 (91). Thus, the bi-directional BW allocation method can be more effectively performed by allowing the MAC layer to identify the RTT_TEST data packet.

Figure 10:
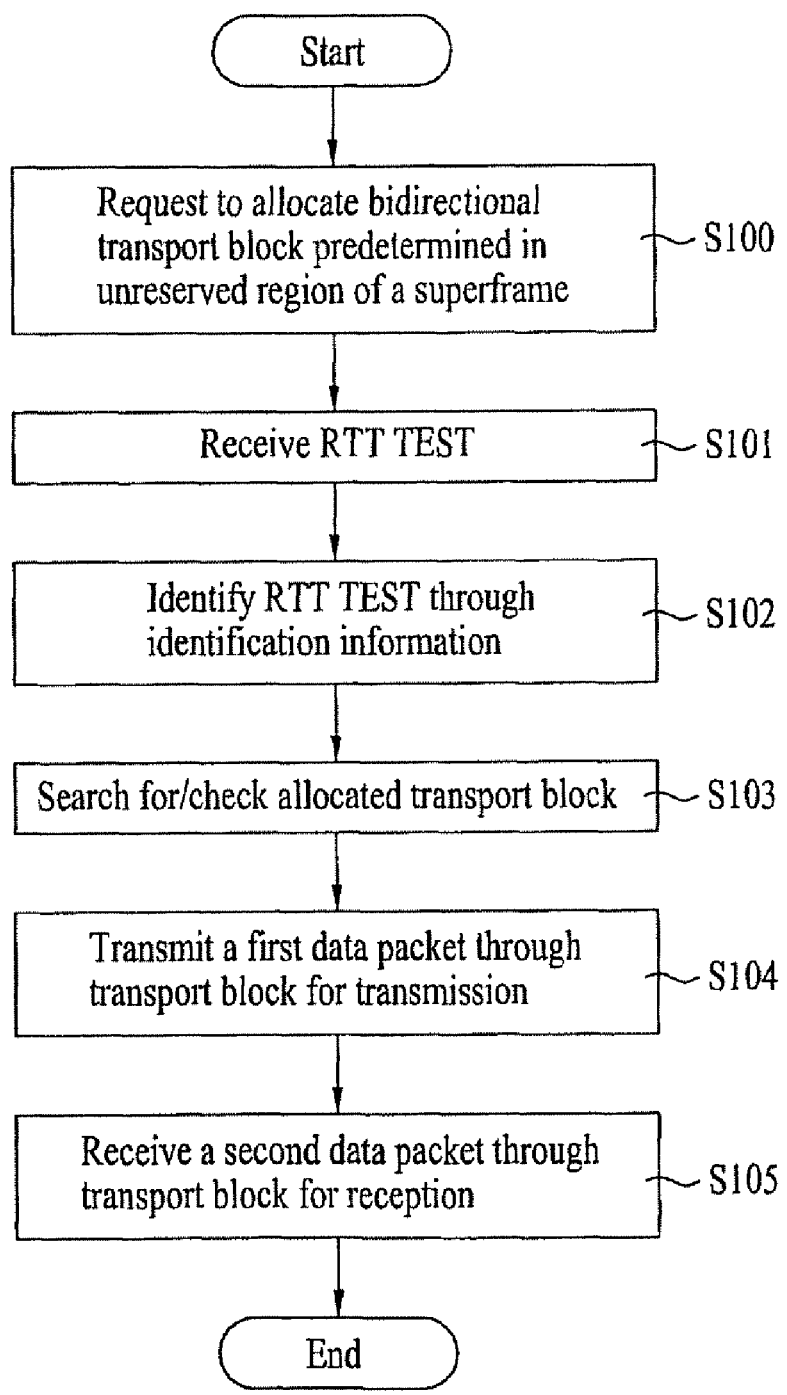
FIG. 10 illustrates another embodiment of the invention.

FIG. 10 illustrates another embodiment of the invention.

The above bi-directional BW allocation method can be performed individually and/or in combination with other transmission method. An example, where the method for identifying data packets and transmitting them regardless of their received order and the bidirectional BW allocation method are used in combination, is described below with reference to FIG. 10.

The following procedure will be able to be applied not only to the case of transmission of an RTT_TEST data packet, which is described as an example, but also to the case of transmission of any other data packet or message.

A first transport block for transmission of an RTT_TEST data packet and a second transport block for reception of a response of the RTT_TEST data packet are allocated (S100). One continuous transport block may also be allocated when bidirectional (transmission and reception-directional) transport is possible.

The MAC layer receives the RTT_TEST data packet (S101) from at least one upper layer. Here, the MAC layer can receive not only the RTT_TEST data packet but also a number of other data packets. The MAC layer checks each received data packet to determine whether or not it is an RTT_TEST data packet. Examples of the method for identifying the data packet include the method of using the identification information transmitted together with the data packet, the method of using a priority information, and the method of using buffers that are physically or logically distinguished from each other.

When the data packet has been identified as an RTT_TEST data packet, the MAC layer searches for or checks the transport block for transmission and the transport block for reception that have been allocated at step S100. The MAC layer can check these transport blocks through a broadcast beacon, a received message, or a response message received during the allocation procedure.

The MAC layer transmits the data packet through the first transport block for transmission (S104). The MAC layer can receive the data packet through the second transport block for reception within a preset time (S105). Then, the example procedure for checking the round trip time is terminated.

All or part of the processes shown in FIG. 10 can be performed and the processes are not necessarily performed in the order illustrated in FIG. 10. Some of the processes shown in FIG. 10 can be performed before the embodiments of the invention are performed and some other processes can also be performed.

Terms used in the above descriptions can be replaced with others. For example, it will be apparent that a device can be replaced with a user device (or equipment) or station, a coordinator can be replaced with coordinating (or control) equipment, a coordinating (or control) device, a coordinating (or control) station, or a piconet coordinator (PNC). In addition, the term "data packet" is used to generally describe information transmitted and received such as a message, traffic, a video/audio data packet, or a control data packet, without being limited to a specific data packet.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims.

For example, the above description has been given focusing on the RTT_TEST data packet, the methods of the invention can be applied to any other data packet. The methods of the invention can also be applied when there is a need to quickly transmit data without delay even if the data does not correspond to the round trip message in the above embodiments.

Accordingly, the invention should not be limited to the specific embodiments described herein, but should be accorded the broadest scope consistent with the principles and features disclosed herein.

INDUSTRIAL APPLICABILITY

The present invention can be applied to a wireless communication system and a wireless HD system. The present invention provides embodiments of a data packet transmission method which can reduce data packet transmission delay by bi-directional reservation method.

The invention claimed is:

1. A method of allocating channel resources at a first device in a wireless network, the method comprising:
transmitting a bandwidth request command to a coordinator for requesting channel resources, the bandwidth request command comprising an indicator indicating that the requested channel resources are bi-directional channel time blocks (CTBs), information associated with a number of CTBs to be allocated, and information related to a minimum schedule period and a maximum schedule period, wherein the bi-directional CTBs comprise a first CTB and a second CTB, and the first CTB is to be used by the first device to transmit a first message to a second device and the second CTB is to be used by the second device to transmit a second message to the first device in response to the first message;

receiving allocation information for allocating the first and second CTBs in a superframe from the coordinator, wherein the allocation information comprises a first field indicating that the allocated first and second CTBs are the bi-directional CTBs;

transmitting the first message to the second device using the first CTB; and receiving the second message in response to the first message by using the second CTB from the second device.

2. The method of claim 1, wherein the allocation information is received in a beacon broadcast by the coordinator.

3. The method of claim 1, wherein the allocation information is received on a low rate physical (LRP) channel among a high rate physical (HRP) channel and the LRP channel used in the wireless network.

4. The method of claim 1, wherein the allocation information further comprises a second field indicating whether the allocated first and second CTBs are associated with a static schedule or a dynamic schedule.

5. The method of claim 4, wherein the allocation information further comprises a third field indicating a PHY mode to be used in the first and second CTBs.

6. The method of claim 1, further comprising receiving a bandwidth response command in response to the bandwidth request command from the coordinator before receiving the allocation information, the bandwidth response command comprising a reason code of "SUCCESS" to indicate that the first and second CTBs can be allocated in the superframe.

7. The method of claim 1, wherein the indicator is set to one if the requested channel resources are a pair of the first CTB and the second CTB.

8. A method of allocating channel resources at a coordinator in a wireless network, the method comprising:

receiving a bandwidth request command from a first device for requesting channel resources, the bandwidth request command comprising an indicator indicating that the requested channel resources are bi-directional channel time blocks (CTBs), information associated with a number of CTBs to be allocated, and information related a minimum schedule period and a maximum schedule period, wherein the bi-directional CTBs comprise a first CTB and a second CTB, and the first CTB is to be used by the first device to transmit a first message to a second device and the second CTB is to be used by the second device to transmit a second message to the first device in response to the first message; and broadcasting allocation information for allocating the first and second CTBs in a superframe, wherein the allocation information comprises a first field indicating that the allocated first and second CTBs are the bi-directional CTBs.

9. The method of claim 8, wherein the allocation information is included in a broadcast beacon.

10. The method of claim 8, wherein the second message is a response to the first message.

11. The method of claim 8, wherein the allocation information is broadcast on a low rate physical (LRP) channel among a high rate physical (HRP) channel and the LRP channel used in the wireless network.

12. The method of claim 8, wherein the allocation information further comprises a second field indicating whether the allocated first and second CTBs are associated with a static schedule or a dynamic schedule.

13. The method of claim 12, wherein the allocation information further comprises a third field indicating a PHY mode to be used in the first and second CTBs.

14. The method of claim 8, further comprising transmitting a bandwidth response command in response to the bandwidth request command to the first device before broadcasting the allocation information, the bandwidth response command comprising a reason code of "SUCCESS" to indicate that the first and second CTBs can be allocated in the superframe.

15. The method of claim 8, wherein the indicator is set to one if the requested channel resources are a pair of the first CTB and the second CTB.

* * * * *